US008406561B2

(12) United States Patent
Hadap et al.

(10) Patent No.: US 8,406,561 B2
(45) Date of Patent: *Mar. 26, 2013

(54) METHODS AND SYSTEMS FOR ESTIMATING ILLUMINATION SOURCE CHARACTERISTICS FROM A SINGLE IMAGE

(75) Inventors: Sunil Hadap, San Jose, CA (US); Jorge Moreno Lopez, Zaragoza (ES)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,231

(22) Filed: Dec. 8, 2011

(65) Prior Publication Data

US 2012/0076421 A1    Mar. 29, 2012

Related U.S. Application Data

(63) Continuation of application No. 11/972,101, filed on Jan. 10, 2008, now Pat. No. 8,094,964.

(60) Provisional application No. 61/000,463, filed on Oct. 26, 2007.

(51) Int. Cl.
   *G06K 9/48*      (2006.01)
   *G06K 9/40*      (2006.01)
   *G06T 15/50*     (2011.01)

(52) U.S. Cl. .................. 382/274; 382/199; 345/426

(58) Field of Classification Search .................. 382/154, 382/199, 274, 299; 345/426, 519; 348/48, 348/169
See application file for complete search history.

(56) References Cited

U.S. PATENT DOCUMENTS

| | | | | |
|---|---|---|---|---|
| 6,455,835 B1* | 9/2002 | Bernardini et al. | ........ | 250/208.1 |
| 6,636,627 B1* | 10/2003 | Oosawa | ........ | 382/154 |
| 7,206,449 B2* | 4/2007 | Raskar et al. | ........ | 382/199 |
| 7,218,792 B2* | 5/2007 | Raskar et al. | ........ | 382/254 |
| 2010/0039427 A1 | 2/2010 | Yun | | |

FOREIGN PATENT DOCUMENTS

GB    2454096    3/2010

OTHER PUBLICATIONS

Pascal Lagger, Pascal Fua, Using Specularities to Recover Multiple Light Sources in the Presence of Texture, Proceedings of the 18th International Conference on Pattern Recognition, p. 587-590, Aug. 20-24, 2006.*

Yufei Zhang; Yee-Hong Yang; , "Illuminant direction determination for multiple light sources," Computer Vision and Pattern Recognition, 2000. Proceedings. IEEE Conference on , vol. 1, No., pp. 269-276 vol. 1, 200.*

File History of U.S. Patent 8, 094,964 (148 pages).

(Continued)

*Primary Examiner* — Andrae S Allison
(74) *Attorney, Agent, or Firm* — Kilpatrick Townsend & Stockton LLP

(57) ABSTRACT

Certain embodiments provide systems and methods for determining light source characteristics from an image. An image having pixels is received that is affected by a light source. A silhouette boundary is received. The image may be filtered to decrease diffuse reflectivity. The presence of light sources is estimated by identifying a local maxima pixel around the silhouette boundary. The local maxima pixel may be associated with the light source. A slant angle that is associated with the light source is estimated using the silhouette boundary. A tilt angle associated with the light source is estimated using the slant angle and local maxima pixel intensity. The relative intensity of each light source may be determined. The ambient light intensity of the image may be determined. The characteristics, such as the slant angle and tilt angle, may be provided to a user.

20 Claims, 7 Drawing Sheets

OTHER PUBLICATIONS

Brunelli, Roberto, "Estimation of Pose and Illuminant Direction for Face Processing," Massachusetts Institute of Technology Artificial Intelligence Laboratory and Computational Learning Department of Brain and Cognitive Sciences, A.I. Memo No. 1499, C.B.C.I. Memo No. 102, Nov. 1994, pp. 1-10.

Dubevec, Paul, "Rendering Synthetic Objects in Real Scenes: Bridging Traditional and Image-based Graphics with Global Illumination and High Dynamic Range Photography," In SIGGRAPH 98, Jul. 1998, pp. 189-198.

Durand, Frédo, et al., "Fast Bilateral Filtering for the Display of High-Dynamic-Range Images," ACM Transactions on Graphics, 2002, pp. 257-265.

Fang, Hui, et al., "Textureshop: Texture Synthesis as a Photograph Editing Tool," Proc. SIGGRAPH 2004, pp. 354-359.

Kajiya, James T., "The Rendering Equation," SIGGRAPH '86: Proc. Of the $13^{th}$ annual conference on Computer graphics and interactive techniques, 1986, pp. 143-150.

Khan, et al. "Imaged-Based Material Editing," ACM Transactions on Graphics (Proceedings of SIGGRAPH), vol. 25(3), Jul. 2006.

Koenderink, Jan J., et al., "Light direction from shad(ow)ed random Gaussian surfaces," Perception 2004, vol. 33, pp. 1405-1420.

Langer, Michael S., et al., "A prior for global convexity in local shape-from-shading," Technical Report No. 081, Perception 2001, vol. 30, pp. 403-410.

Nillius, Peter, et al., "Automatic Estimation of the Projected Light Source Direction," Proc. IEEE Computer Soc. Conf. Computer Vision and Pattern Recognition (CVPR). IEEE CS Pres, 2001, pp. 1076-1083.

Nishino, Ko, et al., "Eyes for Relighting," ACM Transactions on Graphics (also Proc. Of SIGGRAPH). vol. 23, No. 3, Jul. 2004, pp. 704-711.

Ostrovsky, Yuri, et al., "Perceiving illumination inconsistencies in scenes," Perception 2005, vol. 34, pp. 1301-1314.

Pentland, Alex P., "Finding the illuminant direction," J. Opt. Soc. Am./vol. 72, No. 4, Apr. 1982, pp. 448-455.

Quan, Long, et al., "Image-based Plant Modeling," Association for Computing Machinery, Inc., 2006, pp. 599-604.

Ramachandran, V. S., "Perception of shape from shading," Nature vol. 331, Jan. 14, 1988, pp. 163-166.

Samaras, Dimitrios, et al., "Coupled Lighting Direction and Shape Estimation from Single Images," 1999, ICCV.

Stewart, A. James, et al., "Toward Accurate Recovery of Shape from Shading Under Diffuse Lighting," IEEE Transactions on Patterned Analysis and Machine Intelligence, vol. 19, No. 9, Sep. 1997, pp. 1020-1025.

te Pas, Susan F., et al., "A comparison of material and illumination discrimination performance for real rough, real smooth and computer generated smooth spheres," In APGV '05: Proceedings of the $2^{nd}$ ACM Symposium on Applied Perception in Graphics and Visualization, 2005, pp. 75-81.

te Pas, S. F., et al., "Estimations of light source direction depend critically on material BRDFs," Perception 34, 212, Supplement ECVP-5, A Coruna, 2005, p. 139.

Tomasi, C., et al., "Bilateral Filtering for Gray and Color Images," In Proc. IEEE International Conference on Computer Vision, 1998, pp. 839-846.

Wang, Jue, et al., "Soft Scissors: An Interactive Tool for Realtime High Quality Matting," SIGGRAPH 2007, ACM Transactions on Graphics, vol. 26, No. 3, Article 9, Aug. 2007, pp. 9-1-9-6.

Zheng, Qinfen, et al., "Estimation of Illuminant Direction, Albedo, and Shape from Shading," IEEE Transactions of Pattern Analysis and Machine Intelligence, vol. 13 No. 7, Jul. 1991, pp. 680-702.

Horn, et al., Title Page, "Shape from Shading," MIT Press. 1989.

Lee, Chia-Hoang et al., "Improved Methods of Estimating Shape From Shading Using the Light Source Coordinate System," "Shape from Shading," MIT Press. 1989, edited by Berthold K. P. Horn and Michael J. Brooks, Chapter 11, pp. 323-347.

Lee, David, "A Provably Convergent Algorithm for Shape from Shading," "Shape from Shading," MIT Press. 1989, edited by Berthold K. P. Horn and Michael J. Brooks, Chapter 12, pp. 349-373.

Malik, Jitendra, et al., "Recovering Three-Dimensional Shape From a Single Image of Curved Objects," "Shape from Shading," MIT Press. 1989, edited by Berthold K. P. Horn and Michael J. Brooks, Chapter 13, pp. 375-408.

Mingolla, Ennio, et al., "Perception of Solid Shape from Shading," "Shape from Shading," MIT Press. 1989, edited by Berthold K. P. Horn and Michael J. Brooks. 1989, Chapter 14, pp. 409-441.

Pentland, Alex P., "Local Shading Analysis," "Shape from Shading," MIT Press. 1989, edited by Berthold K. P. Horn and Michael J. Brooks, Chapter 15, pp. 443-487.

Wildey, Robert L., "Radarclinometry for the Venus Radar Mapper," "Shape from Shading," MIT Press. 1989, edited by Berthold K. P. Horn and Michael J. Brooks, Chapter 16, pp. 489-511.

Woodham, Robert J., "Photometric Method for Determining Surface Orientation from Multiple Images," "Shape from Shading," MIT Press. 1989, edited by Berthold K. P. Horn and Michael J. Brooks, Chapter 17, pp. 513-532.

"Shape-from-Shading Bibilography," "Shape from Shading," MIT Press. 1989, edited by Berthold K. P. Horn and Michael J. Brooks, pp. 533-569.

"Basic Parameter Values for the HDTV Standard for the Studio and for International Programme Exchange," ITU-R BT.709-1, Recommendation ITU-R BT.709-1 (1990-1994).

Combined Search and Examination Report under Sections 17 and 18(3) for Application No. GB0819607.3, dated Feb. 20, 2009.

Zhou, et al. "Estimation of Illuminant Direction and Intensity of Multiple Light Sources," Published 2002, Department of Computer Science, Drexel University, pp. 206-220.

Yang, et al. "Sources from Shading," Published 1991, IEEE Computer Society Conference on Computer Vision & Pattern Recognition, pp. 534-539.

Response to the Combined Search and Examination Report and Amended Specification for GB Application No. 0819607.3, filed Aug. 21, 2009 (37 pages).

Examination Report under Section 18(3) for GB Application No. 0819607.3, mailed Dec. 3, 2009(1 page).

Response to Examination Report and Amended Specification for GB Application No. 0819607.3, filed Jan. 5, 2010 (39 pages).

Morena et al., "Light Source Detection in Photographs", CEIG'09, San Sebastian, Sep. 9-11, 2009.

Yufei Zhang, Yee-Hong Yang, "Illuminant Direction Determination for Multiple Light Sources," Computer Vision and Pattern Recognition, 2000, Proceedings, IEEE Conference, vol. 1, No. pp. 269-276 vol. 1, 2000.

N. Funk, "Implementation of an Illuminant Detection Algorithm", Project Report for CMPUT 615, University of Alberta, 2003.

Pascal Lagger, Pascal Fua, Using Specularities to Recover Multiple Light Sources in the Presence of Texture, Proceedings of the $18^{th}$ International Conference on Pattern Recognition, p. 587-590, Aug. 20-24, 2006.

Bouganis et al., Multiple Light Source Detection, IEEE Transactions on Pattern Analysis and Machine Intelligence, vol. 26, No. 4, Apr. 2004.

Nathan Funk, "A Review of Selected Single Light Source Detection Methods", http://vwwv.njfunk.com/research/courses/605/a1-single.pdf, Sep. 2004.

\* cited by examiner

METHODS AND SYSTEMS FOR ESTIMATING ILLUMINATION SOURCE CHARACTERISTICS FROM A SINGLE IMAGE

CROSS-REFERENCE TO RELATED APPLICATIONS

This application is a continuation of U.S. patent application Ser. No. 11/972,101, now issued U.S. Pat. No. 8,094,964, filed Jan. 10, 2008, which claims priority to U.S. Provisional Patent Application No. 61/000,463 filed Oct. 26, 2007, entitled "Methods and Systems for Estimating Illumination Source Characteristics from a Single Image," the entire contents of each of which are hereby incorporated by reference.

FIELD OF THE DISCLOSURE

The present disclosure relates generally to image processing and more particularly to estimating characteristics associated with illumination sources affecting an image lighting environment.

BACKGROUND

Images such as photography, paintings, and moving pictures may include objects affected by one or more light sources. The light sources may affect the visual imagery of objects in an image, yet are absent in the image itself. For example, a light bulb located beside a photographer may affect the visual imagery of the objects in an image obtained by the photographer. In computer vision and graphics, estimation of an image lighting environment is helpful for many applications. The location and relative intensity of one or more light sources may be helpful in recreating the lighting environment to obtain a second image or to ensure a consistent lighting environment when re-shooting a motion picture scene, for example.

Conventional methods for obtaining lighting environment information from images capture information concerning characteristics associated with a single light source and involve invasive techniques. Thus, they have limited ability to capture lighting environment characteristics and may disrupt the image.

SUMMARY

Certain aspects and embodiments provide systems and methods for determining light source characteristics from an image. In one embodiment, an image having pixels is received that is affected by a light source. A selection of a silhouette boundary is received. The presence of the light source is estimated by identifying a local maxima pixel around the silhouette boundary. The local maxima pixel may be associated with the light source. A slant angle that is associated with the light source is estimated using the silhouette boundary. A tilt angle associated with the light source is estimated using the slant angle and an intensity of the local maxima pixel by analyzing at least one pixel along a slant angle direction vector. The characteristics, such as the slant angle and tilt angle, may be provided to a user.

Some received images may be affected by a plurality of light sources. In some embodiments, characteristics of each light source may be determined and/or estimated.

In some embodiments, the image may be filtered to decrease or remove diffuse reflectivity by removing low frequency image information and the ambient light intensity of the image may be determined and provided to a user.

In one embodiment, a system is provided for determining light source characteristics of an image affected by a light source. The system can include an input device that can receive inputs from a user. A processor-based device may be included in the system that includes a light detection engine. The processor-based device may be adapted to receive the image for processing and a selection of a silhouette boundary. The light detection engine may be adapted to, identify a local maxima pixel associated with the light source to estimate a presence of the light source, use the silhouette boundary to estimate a slant angle associated with the light source, and use the slant angle, slant angle direction vector, and local maxima pixel intensity to estimate a tilt angle. The system may also include an output device adapted to receive the slant angle and tilt angle.

These embodiments are mentioned not to limit or define the inventive concepts disclosed herein, but to provide examples of embodiments to aid understanding thereof. Embodiments are discussed in the Detailed Description, and further description of the inventive concepts is provided there. Advantages offered by the various embodiments may be further understood by examining this specification.

BRIEF DESCRIPTION OF THE DRAWINGS

These and other features, aspects, and advantages are better understood when the following Detailed Description is read with reference to the accompanying drawings, wherein.

DETAILED DESCRIPTION

Certain aspects and embodiments described herein provide systems and methods for non-invasively determining characteristics associated with one or more light sources affecting an image. Characteristics associated with the one or more light sources may include a direction or location of each light source relative to objects in the image and a relative intensity of each light source to each other. Information regarding the characteristics may be provided to a user. The user may use lighting characteristics obtained via various embodiments in many applications. For example, the user may use the characteristics to reproduce the characteristics in a lighting environment to reproduce the image, produce another image using similar light characteristics, or insert synthetic objects in the image by matching the lighting characteristics. Other applications include shape from shading for multiple light sources, image classification and relighting.

In some embodiments, lighting characteristics associated with one or more light sources are inferred from an image. A silhouette boundary may be selected, manually or automatically, defining an area of image in which lighting characteristics are inferred. Areas within the silhouette boundary may be filtered to separate high frequency variations of luminance due to image diffuse reflectivity or albedo from low frequency variations of luminance due to shading. Albedo is a measure without a unit that is indicative of the diffuse reflectivity of a surface or body of an image object. The illumination intensity variations of the silhouette pixels are analyzed to determine a pixel or pixels with the highest luminance. Each of the pixels identified with the highest luminance may be associated with a light source. A zenith coordinate (slant angle) associated with each light source may be determined. An azimuth coordinate (tilt angle) is determined for each light source based, at least in part, on the slant angle. In a three-dimensional coordinate system, a zenith coordinate or slant angle is the angle between the z-axis and a slant angle direction vector. A slant angle direction vector may be a vector derived from a normal light source direction vector. An azimuth coordinate or tilt angle is the angle between the positive x-axis and the slant angle direction vector.

Ambient light may be determined by analyzing silhouette pixels. Ambient light may be the general overall light in an image that is not necessarily associated with a particular light source. Information regarding the presence of each light source, the coordinates of each light sources, the relative intensity of each light source, and the ambient light may be provided to a user.

Illustrative System Implementation

Figure 1:
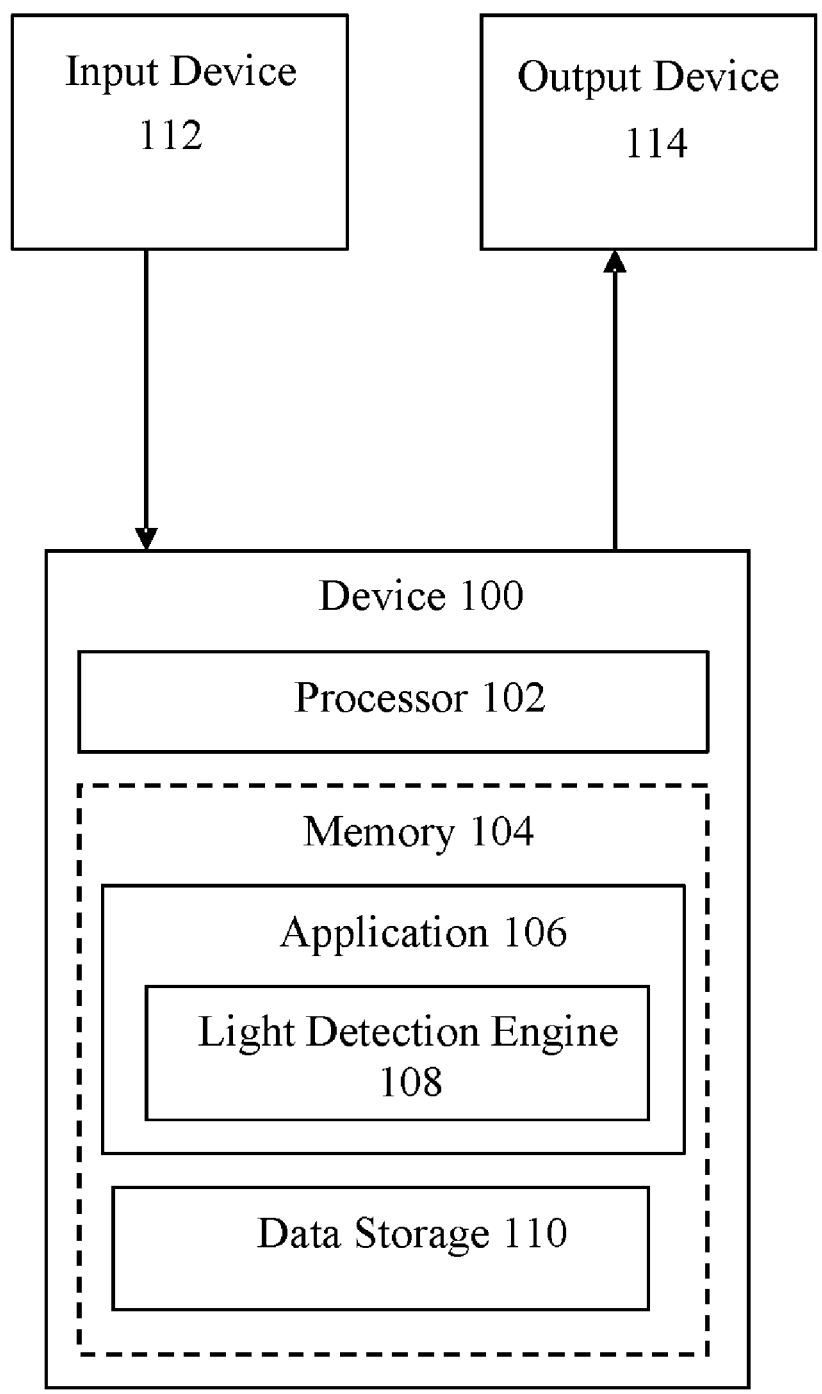
FIG. 1 is a system diagram illustrating a light source characteristic determination system according to one embodiment.

Methods according to various embodiments of the inventive concepts disclosed herein may be implemented on a variety of different systems. An example of one such system is illustrated in FIG. 1. The system includes a processor-based device 100 that includes a processor 102 and a computer-readable medium, such as memory 104. The device 100 may be any type of processor-based device, examples of which include a computer and a server. Memory 104 may be adapted to store computer-executable code and data. Computer-executable code may include an application 106, such as an image editor program, that can be used to analyze and edit images. The application 106 may include a light detection engine 108 that, as described in more detail below, may be adapted to perform methods according to various embodiments to determine image lighting characteristics. In some embodiments, the light detection engine 108 may be a separate application that is executable separate from, and optionally concurrent with, application 106.

Memory 104 may also include a data storage 110 that is adapted to store data generated by the application 106 or light detection engine 108, or input by a user. In some embodiments, data storage 110 may be separate from device 100, but connected to the device 100 via wire line or wireless connection.

The device 100 may be in communication with an input device 112 and an output device 114. The input device 112 may be adapted to receive user input or images and communicate the user input or images to the device 100. Examples of input device 112 include a keyboard, mouse, scanner, and network connection. User inputs can include commands that cause the processor 102 to execute various functions associated with the application 106 or the light detection engine 108. The output device 114 may be adapted to provide data or visual output from the application 106 or the light detection engine 108. In some embodiments, the output device 114 can display a visual representation of the image and provide a graphical user interface (GUI) that includes one or more selectable buttons that are associated with various functions provided by the application 106 or the light detection engine 108. Examples of output device 114 include a monitor, network connection, and printer.

Illustrative Methods for Determining Light Source Characteristics

Figure 2:
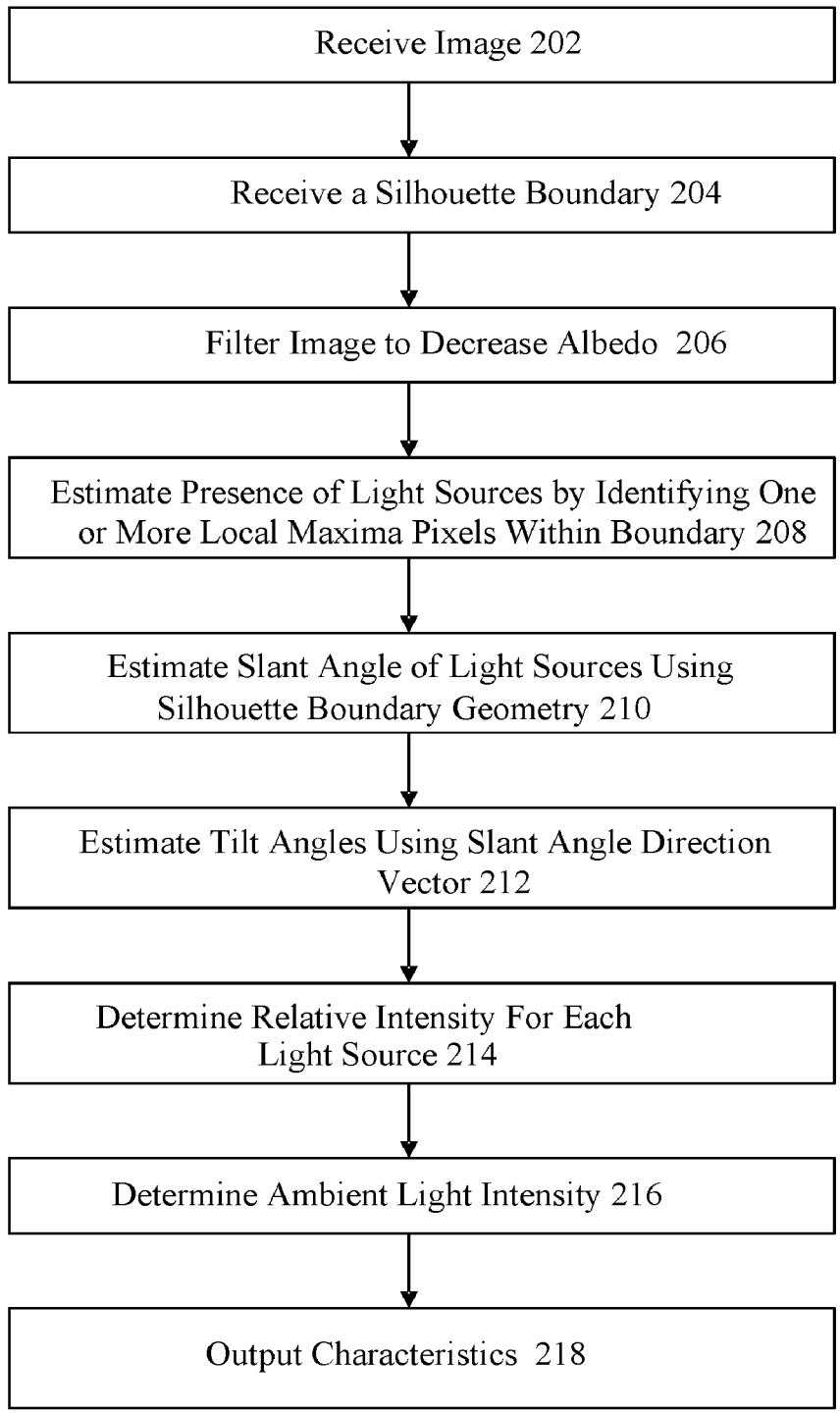
FIG. 2 is a flow chart illustrating a method for determining light source characteristics according to one embodiment.

Various methods according to various embodiments of the inventive concepts disclosed herein can be used to detect characteristics associated with one or more light sources affecting an image. FIG. 2 illustrates one embodiment of a method to determine light source characteristics. For purposes of illustration only, the elements of this method are described with reference to the system depicted in FIG. 1, coordinate system diagram in FIG. 3, flow chart depicted in FIG. 4, and images depicted in FIGS. 5A-C.

In block 202, the light detection engine 108 receives an image. The image may be received from the input device 112. For example, a user may use a scanner to obtain an electronic representation of a photograph or painting and store the image in data storage 110. The user may also obtain an image via any digital image capture apparatus, such as a camera, and store an electronic version of the image in data storage 110. The user may also download an image that is stored at a remote location via a network connection from the internet or an intranet. In some embodiments, the application 106 may provide a function with which the user can cause an image stored in data storage 110 to be selected and sent to the light detection engine 108 for analysis.

In block 204, the light detection engine 108 receives a selection of a silhouette boundary. The silhouette boundary may be a boundary defining the shape or portion of an object in an image. In some embodiments, the silhouette boundary may be selected manually by the user. For example, the user can use a mouse or another type of input device 112 to select points along the boundary of an object in the image. In other embodiments, the light detection engine 108 automatically analyzes pixels in the image and determines the presence of objects and selects the boundary of those objects. The object boundaries may be automatically identified as silhouette boundaries or provided to the user via the output device 114 such that the user can manually identify the object boundaries as silhouette boundaries or modify the boundaries as desired.

In block 206, light detection engine 108 filters the image to decrease the image's albedo or diffuse reflectivity. In some embodiments, the albedo or diffuse reflectivity of the image may be removed. Changes in albedo and surface indentations may falsely indicate light source effects, even when, for example, light sources have not affected those areas. Luminance intensity changes, albedo changes, and surface indentations occur at different frequency levels. Images may be filtered based on the frequency levels to remove these effects. In some embodiments, the light detection engine 106 uses a bilateral filtering method to remove the albedo. The filtering methods may be used to extract high frequency detail and low frequency detail associated with the image. The high frequency detail may include information associated with the texture and albedo of each image pixel. The low frequency detail may include information associated with the luminance changes for each image pixel, but does not include the albedo of each image pixel. The high frequency detail may be removed.

Figure 5A:
FIG. 5A illustrates an image according to one embodiment.
Figure 5B:
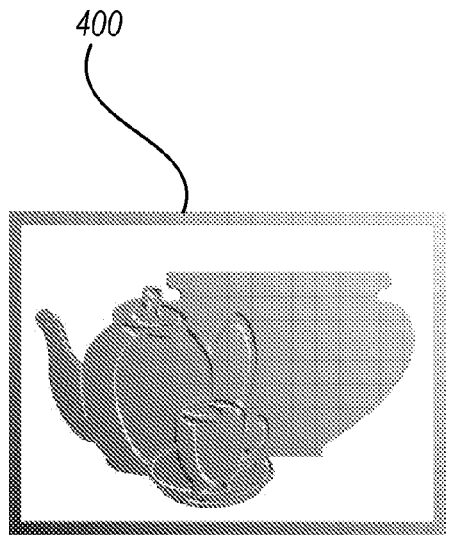
FIG. 5B illustrates the image of FIG. 5A filtered to obtain high frequency pixel information.
Figure 5C:
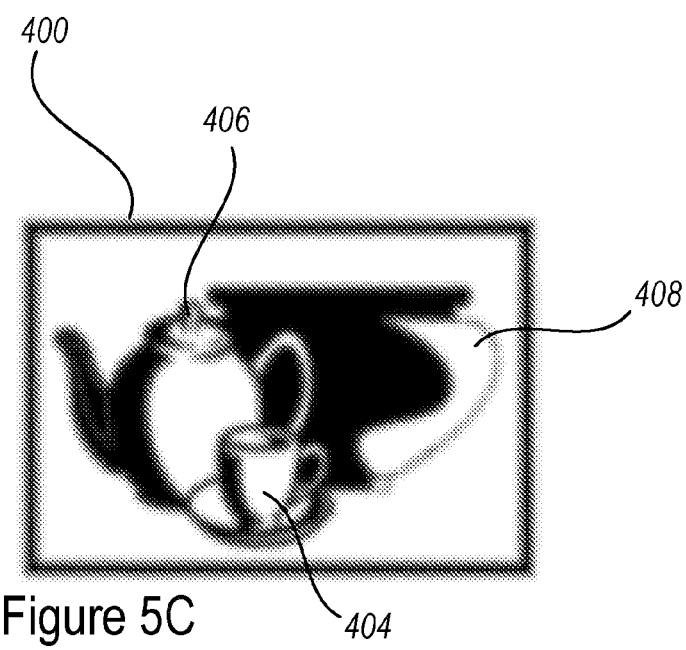
FIG. 5C illustrates the image of FIG. 5A filtered to obtain low frequency pixel information.

FIGS. 5A-C illustrate filtering an image to extract high and low frequency details. FIG. 5A is an unfiltered image 400 containing an object 402 experiencing lighting effects from a light source not shown in the image. FIG. 5B shows the image 400 with low frequency detail extracted. Information regarding the texture of each pixel and albedo is retained in FIG. 5B with the varying high frequency represented using gray-scale coloring. FIG. 5C shows the image 400 with high frequency detail extracted. Luminance changes due to light sources are retained in FIG. 5C with the luminance changes represented using black and white coloring. For example, areas 404, 406, 408 of luminance changes, indicating an effect from a light source, are shown with whiter coloring.

In some embodiments, the image may be filtered using a bilateral filtering method by tuning the image's Gaussian kernels (space and intensity level) to meet the following equation:

$$newL(x, y) = \frac{\sum_u \sum_v b(x, u, y, v) \cdot L_x(x-u, y-v)}{\sum_u \sum_v b(x, u, y, v)}$$

$$b(x, u, y, v) = G_{spatial}\left(\sqrt{(x-u)^2 + (y-v)^2}, \sigma_{spatial}\right) \times G_L(L_x(x-u, y-v) - L_x(x, y), \sigma_L)$$

Where:
L is the luminance intensity;
$G_{spatial}$ is a spatial Gaussian filter kernel;
$G_L$ is an intensity Gaussian filter kernel;
$\delta_{Spatial}$ is a kernel size of the spatial Gaussian filter kernel; and
$\delta_L$ is a kernel size of the intensity Gaussian filter kernel;
Kernel sizes may be as follows: $\delta_{spatial}$=0.05 and $\delta_L$=0.35.

The bilateral filter kernel, b, includes two Gaussian filter kernels, $G_{spatial}$ and $G_L$ with kernel widths of $\delta_{Spatial}$ and $\delta_L$, to provide user control over the recovered object shape. For example, small details may be increasingly suppressed, while overall round shape is emphasized as values of the kernel b is increased. Once the bilateral filter is applied, the low frequency variations, as shown in FIG. 5C, are used to analyze areas affected by light sources. In some embodiments, the bilateral filter is applied in the logarithmic domain for better behavior. A rounding function may be applied to the low frequency image version to emphasize the roundness of the overall shape.

Using filtered images indicating luminance changes, areas affected by light sources may be more easily detected. In addition, silhouette boundaries may be more accurately defined using filtered images. In some embodiments, the image may be filtered before the light detection engine 108 receives the selection of the silhouette boundary in block 204. In other embodiments, the image is analyzed without filtering to remove albedo.

In block 208, the light detection engine 108 estimates the presence of one or more light source by identifying at least one local maxima pixel around the silhouette boundary. The local maxima pixel may be around the silhouette boundary if it is within the area defined by the silhouette boundary, located substantially close to the silhouette boundary, or located on or along the silhouette boundary. Local maxima pixels may be a pixel having a zero luminance gradient and a positive second derivative. The light detection engine 108 may obtain the luminance value for each pixel around the silhouette boundary and identify those pixels having the highest luminance values. In some embodiments, the light detection engine 108 identifies the pixel having the highest luminance values (local maxima pixels) by observing zero crossing of luminance gradient, with a positive second derivative, such that areas affected by different light sources can be identified. For example, a pixels around the silhouette boundary may include multiple pixels having locally high luminance values, but located away from each other. Such silhouette boundary areas can be identified by analyzing the luminance value of each pixel and identifying local maxima pixels. Each local maxima pixel detected indicates the presence of a light source affecting the objects within the image. In some embodiments, the number of light sources may be estimated in an iterative fashion. In other embodiments, images affected by one light source may be received and the local maxima pixel associated with the light source identified.

In block 210, the light detection engine 108 estimates the slant angle and intensity for each light source. In some embodiments, the relative intensities of the light sources may be estimated in an iterative fashion. The slant angle may be determined to identify a location for each light source. Each light source is located at a position relative to the image objects. A normal direction of the light from the light source may be determined using the intensity of the pixels affected by the light source and the geometry of the silhouette boundary. The surface normal on the silhouette boundary may be assumed to be in the image plane and the light detection engine 108 may estimate the slant angle of the individual light sources using pixel luminance intensity variations within the localized area and the silhouette normal. The silhouette normal may be a slant angle direction vector. For example, the surface normal vector for each pixel in the localized area may be perpendicular to the boundary surface at the pixel. The size of the localized area may be set using a pre-set radius or group of pixels. The luminance and surface normal vector may be used to determine the light source direction at each pixel. A voting process may be used to determine the slant angle direction vector based on the light source direction determined for each pixel.

Figure 3:
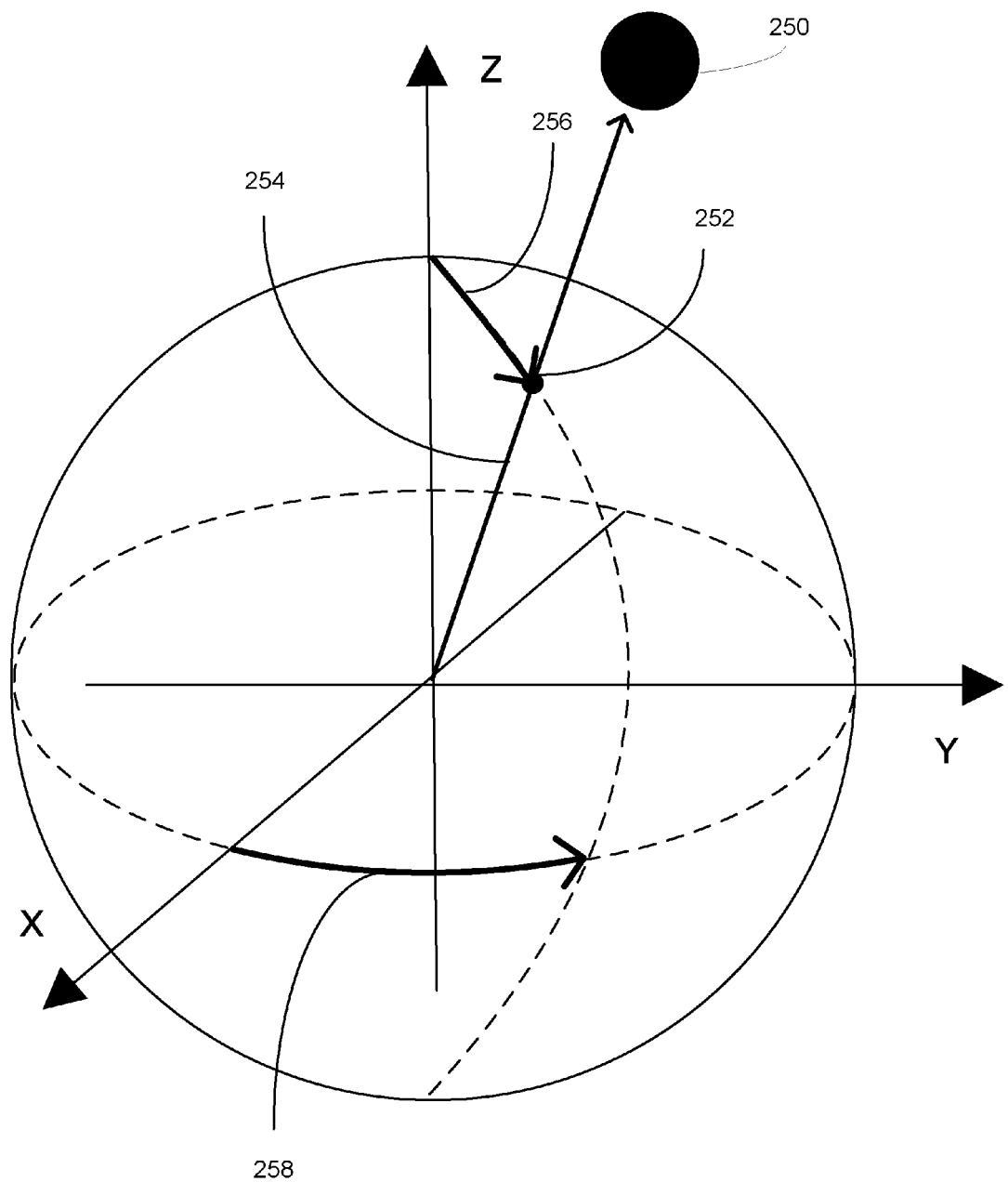
FIG. 3 illustrates a light source affecting a silhouette boundary interposed with three-dimensional coordinate system according to one embodiment.

FIG. 3 illustrates a coordinate system with a light source 250 affecting a point 252 along a boundary of the coordinate system. The point 252 may be a local maxima point detected around a silhouette boundary. After identifying the point 252, the light detection engine 108 may determine a normal light direction relative to the silhouette boundary. The normal light direction may be the direction from the silhouette boundary that the light source 250 is located. Using the normal light direction, the light detection engine 108 can determine a slant angle direction vector 254. The slant angle direction vector 254 may be a vector from zero coordinate to the light source 250 that travels through the point 252. Once the slant angle direction vector 254 is determined, the light detection engine can determine a slant angle 254 between the z-axis and the slant angle direction vector 254.

The following equation may be used to determine the slant angle direction vector and the intensity of the light source:

$$\frac{\sum_{i=1}^{i=n} \vec{N}(p_i)RGB(p_i)}{n} = \vec{L} \cdot I$$

Where:
$\vec{N}(p_i)$ is the surface normal vector for a pixel;
$RGB(p_i)$ is the luminance at the pixel's coordinates;
$\vec{L}$ is the light direction at the pixel; and
I is the light intensity at the pixel.

In some embodiments, the light detection engine 108 may use vectors from pixels other than the local maxima pixel. For example, the light detection engine 108 may determine the pixel having the highest luminance, RGB(p$_t$), and set its light direction as the first light source direction. A secondary light source direction is obtained for each pixel in the silhouette boundary of the localized area. If any of the secondary light directions are less than ninety degrees relative to the light source direction of the pixel having the highest luminance, those secondary light source directions are added to the light direction of the pixel having the highest luminance and multiplied by the luminance of those associated pixels. The existence of a second light source is indicated if any of the secondary light source directions are greater than ninety degrees. Those light source directions are included in the estimation of the second light source and not the first. In some embodiments, two or more pixels may have the same light source direction. A mean luminance is determined for those pixels and only one secondary light source direction may be added to determine the light direction. If two or more pixels indicate the same light direction, a mean luminance is determined for those pixels and only one normal light source direction vector.

Using the slant angle direction vector, the slant (zenith) angle of the light source can be determined by measuring the angle between the slant angle direction vector and a z-axis. This process can be repeated for each light source detected.

In block 212, the light detection engine 108 estimates the tilt (azimuth) angle of the light source using the slant angle direction vector and light source intensity. The tilt angle can be measured from a positive x-axis to the slant angle direction vector. The light detection engine 108 can analyze the variation of the intensity of pixels along the surface of the object and the slant angle direction vector to determine the tilt angle.

Returning to FIG. 3, the light detection engine 108 can analyze the variation of the intensity of pixels along the slant angle direction vector 254 to determine the tilt angle. For example, the light detection engine 108 may start at the point 252 and travel along the slant angle direction vector 254 away from the light source 250 and towards the center of the silhouette boundary. As explained in more detailed below, the intensity gradient of pixels along with slant angle direction vector 254 is measured and a tilt angle 258 can be determined based on the intensity gradient. For example, if the intensity gradient is increasing, the tilt angle 258 is the angle of the slant angle direction vector 254. If the intensity gradient is decreasing, the pixel along the slant angle direction vector 254 having the lowest intensity (not shown) is identified and a lowest intensity tilt angle for the pixel is measured. Ninety degrees is added to the lowest intensity tilt angle to determine the tilt angle for the light source.

Figure 4:
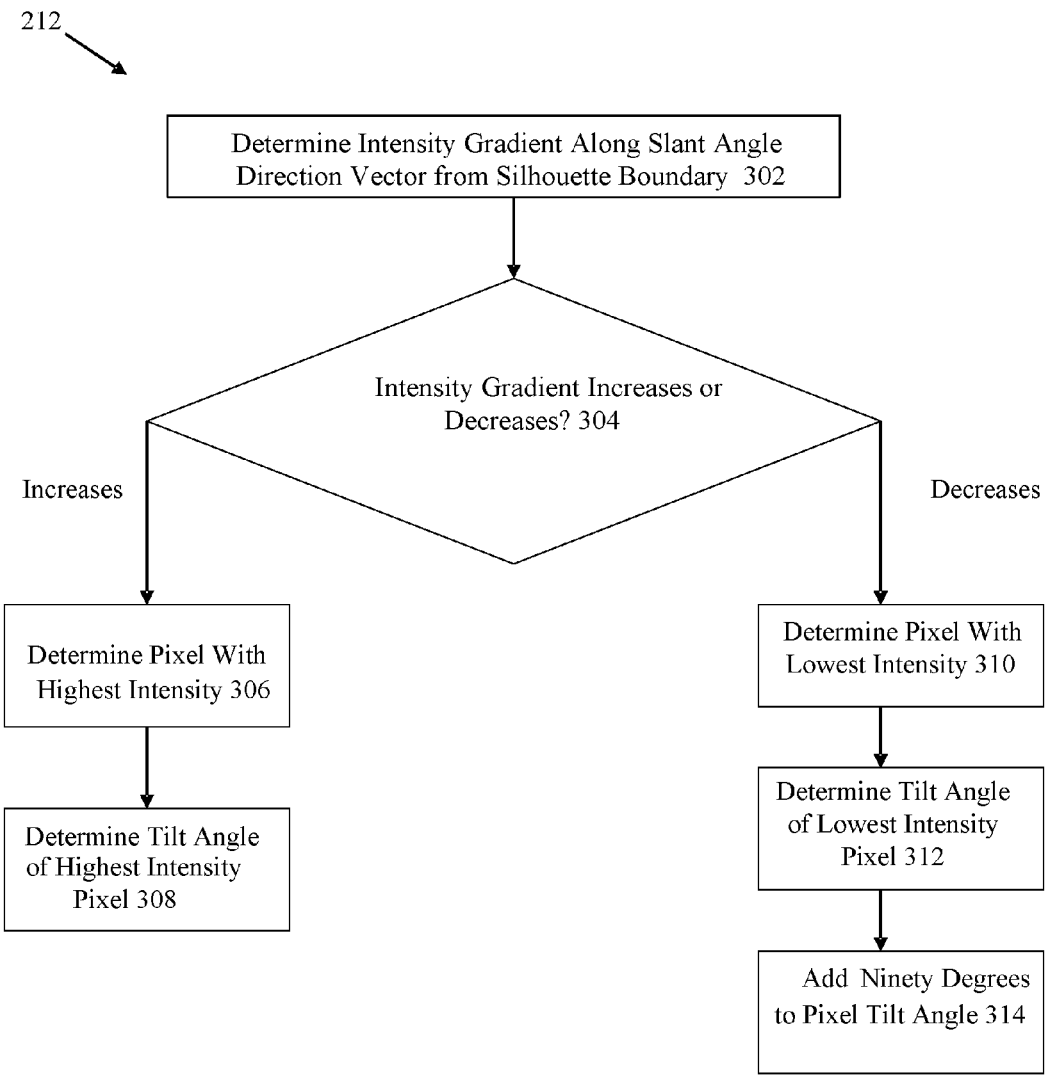
FIG. 4 is a flow chart illustrating a method for estimating a tilt angle associated with a light source according to one embodiment.

FIG. 4 illustrates one embodiment of block 212 for determining the tilt angle of the light source. In block 302 the light detection engine 108 determines an intensity gradient along the slant angle direction vector starting at the silhouette boundary. The intensity gradient is the change in intensity as the pixels are measured starting at the silhouette boundary. The light detection engine 108 may determine the intensity of each pixel along the slant angle direction vector from the silhouette boundary.

In block 304, the light detection engine 108 determines if the gradient is increasing or decreasing. If the change in intensity, as each pixel is measured in order from the silhouette boundary along the slant angle direction vector towards the inside of the silhouette, is greater than 0, the gradient is increasing and indicates a light source was in front of the object. If the change in intensity, as each pixel is measured from the silhouette boundary along the slant angle direction vector towards the inside of the silhouette, is less than 0, the gradient is decreasing and indicates the light source was behind the object.

If the gradient is increasing, the light detection engine 108 determines the pixel having the highest intensity in block 306. The tilt angle of the pixel having the highest intensity is determined in block 308 by measuring the tilt angle of a vector from the light source through the pixel having the highest intensity. The tilt angle of the pixel having the highest intensity is the same as the tilt angle of the light source.

If the gradient is decreasing, the light detection engine 108 determines the pixel having the lowest intensity in block 310. The tilt angle of the pixel having the lowest intensity is determined in block 312. The tilt angle of the light source is determined by adding ninety degrees to the lowest intensity pixel tilt angle in block 314.

The method may be repeated for each detected light source. Returning now to FIG. 3, once the tilt angle of each light source is determined, the light detection engine 108 may determine the relative intensity of each light source in block 214. The relative intensity of each light source can be determined by comparing the intensities of each light source to each other and assigning a relative intensity value based on those intensities to each light source. The relative intensity value may be a number on scale with which the relative intensity of each light source can be compared. In some embodiments, the relative intensity value of the local maxima pixel associated with each light source may be used to compare the intensities of each light source. In other embodiments, a mean average of all pixels within the pre-set radius or group of pixels associated with each light source is determined and used to compare the intensities of each light source.

In block 216, the light detection engine 108 may determine the ambient light intensity of the image. The light detection engine 108 identifies the pixel having the lowest intensity. The pixel may be within the silhouette boundary or, in some images, outside the silhouette boundary. The intensity of the pixel having the lowest intensity is identified as the ambient light intensity of the image.

In block 218, the light detection engine 108 outputs characteristics associated with the image. The characteristics can include the intensity of the ambient light, identification of each light source detected, the slant angle and tilt angle of each light source, and the relative intensity of each light source. The light detection engine 108 may output the characteristics by providing them to the output device 114. For example, the characteristics may be displayed on the GUI or sent via a network connection to a location on the network. In some embodiments, the characteristics are associated with the image and stored in data storage 110.

Illustrative Example of Determining Light Source Characteristics

Figure 6A:
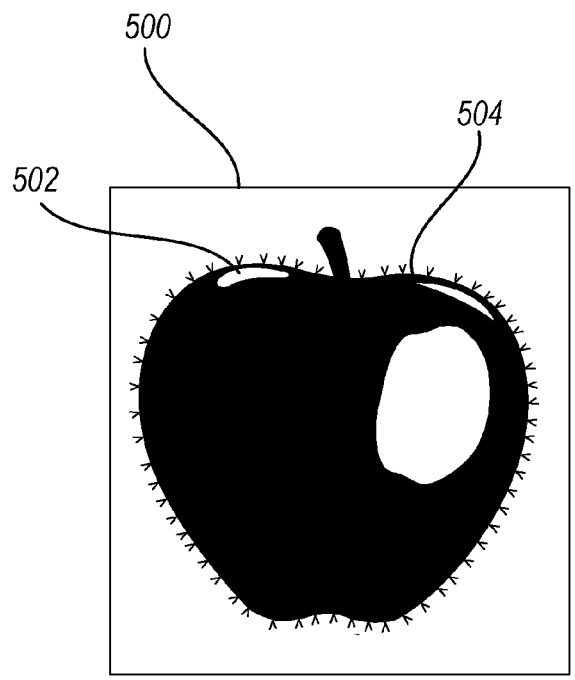
FIGS. 6A-E illustrate an example of determining characteristics associated with a plurality of light sources affecting an image according to one embodiment.
Figure 6B:
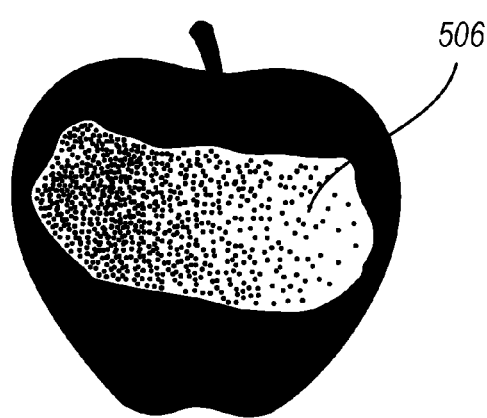
Figure 6C:
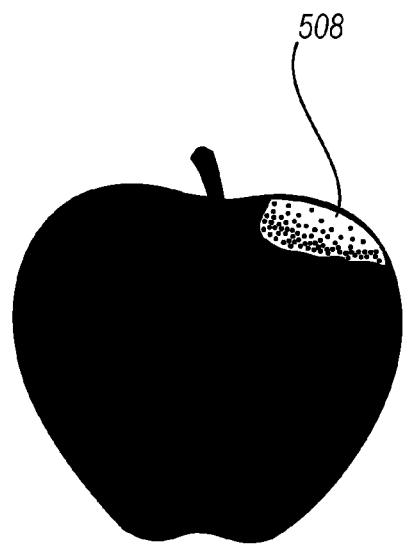
Figure 6D:
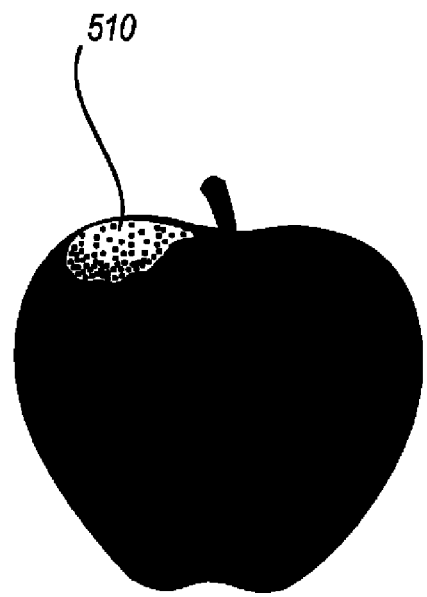

An example of determining characteristics associated with a light source using an image according to one embodiment of inventive concepts disclosed herein is described below with reference to FIGS. 6A-E. FIG. 6A shows an image 500 that includes an apple 502 as an object. The image 500 is received, along with a silhouette boundary 504. The silhouette boundary 504 generally defines the boundary of the pixels associated with the apple 502. The silhouette boundary 504 includes pixels affected by three light sources. FIGS. 6B-D show filtered images with albedo decreased or removed, in which pixels affected by each light source are shown in white color. FIG. 6B illustrates pixels 506 located on the front of the apple 502 affected by a first light source. FIG. 6C illustrates pixels 508 located approximately forty-five degrees relative to the x-axis of the image affected by a second light source. FIG. 6D illustrates pixels 510 located at the top of the apple 502 and slightly to the left of center. Each of these sets of pixels 506, 508, 510 define three different groups of pixels, each of which includes a local maxima pixel having the highest luminance intensity within that group.

The local maxima pixel for each group of pixels is identified and the presence of each light source can be determined. The relative intensity of each light source can be determined using the intensity of each local maxima pixel. The slant angle direction vector is detected using the silhouette boundary geometry. For example, a first light source direction vector for the local maxima pixel in set of pixels 506 can be determined. Secondary light source direction vectors for other pixels within set of pixels 506 can be determined and added to the light source direction vector for the local maxima pixel to obtain the slant angle direction vector. The slant angle of each light source can be determined using the slant angle direction vector.

Figure 6E:
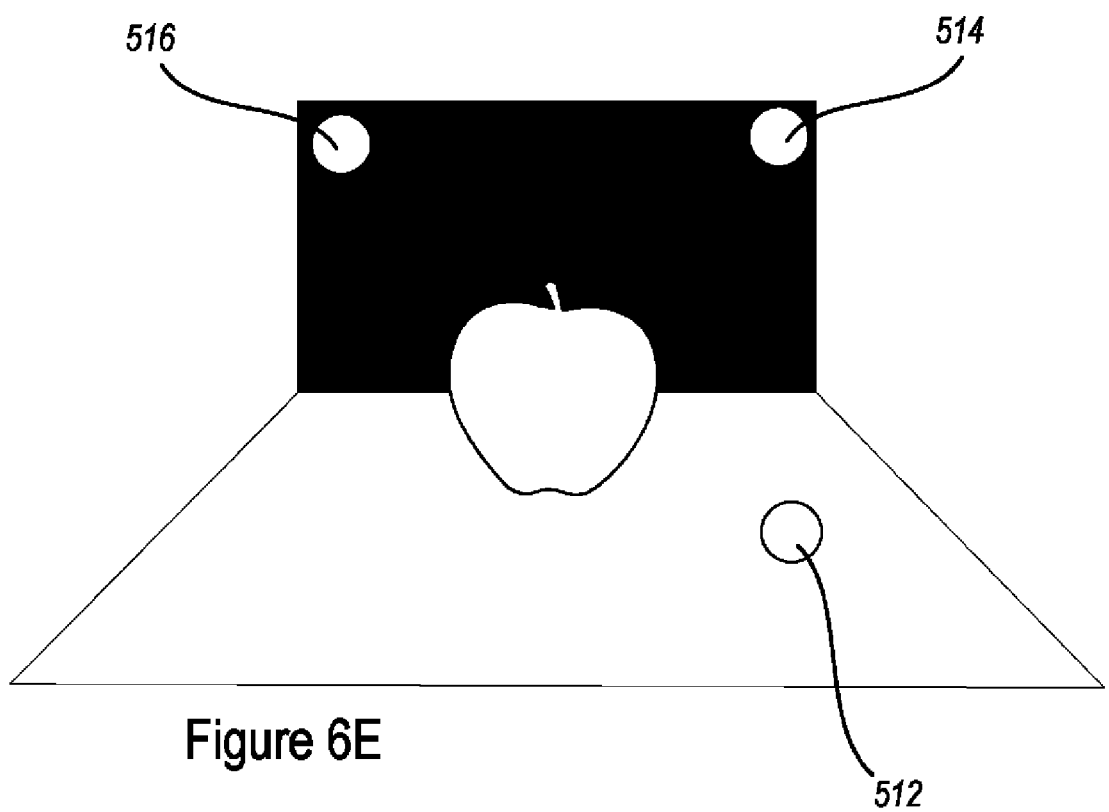

The tilt angle for each light source is determined using the slant angles by determining the intensity gradient of pixels starting from the silhouette boundary and following a line defined by the slant angle direction vector. For set of pixels 506, the light source is in front of the apple 502 and the intensity gradient increases. Thus, the tilt angle of the pixel having the maximum intensity is the tilt angle of the light source. For both set of pixels 508 and 510, the intensity gradient decreases, indicating a light source that is behind the apple 502. The pixel within each set of pixels 508, 510 having the lowest intensity is determined, along with the tilt angle for each of those pixels. The tilt angle for each light source associated with set of pixels 508, 510 is determined by adding ninety degrees to the each pixel's tilt angle. FIG. 6E is a graphical representation of the apple 502 and the relative location of each light source 512, 514, 516.

The ambient light intensity can be determined from the image 500 in FIG. 6A. The pixel within the silhouette boundary 504 having the lowest intensity is identified. This pixel may be located in the shadowed area on the far left side of apple 502. The intensity of that pixel is the ambient light intensity for the image 500.

After all the characteristics are determined, they may be provided to a user via a graphical user interface (GUI). The user can then use the characteristics to recreate the lighting environment in order to obtain a second image of the apple 502 using the same lighting characteristics or to create synthetic objects and include them in image 500 using the lighting characteristics.

The foregoing description of the embodiments of the inventive concepts has been presented only for the purpose of illustration and description and is not intended to be exhaustive or to limit the inventive concepts to the precise forms disclosed. Numerous modifications and adaptations are apparent to those skilled in the art without departing from the spirit and scope of the inventive concepts.

What is claimed is:

1. A method comprising:
    estimating a presence of a light source from an image having been affected by the light source by identifying a local maxima pixel associated with the light source around a silhouette boundary in the image;
    estimating a slant angle associated with the light source using the silhouette boundary;
    estimating a tilt angle associated with the light source based on at least one pixel and the slant angle; and
    outputting the slant angle and tilt angle.

2. The method of claim 1, wherein the image is affected by a plurality of light sources, the method further comprising:
    estimating a presence of the plurality of light sources by identifying a plurality of local maxima pixels around the silhouette boundary, wherein each local maxima pixel is associated with at least one of the plurality of light sources;
    estimating a slant angle and a tilt angle associated with each of the plurality of light sources;
    determining a relative intensity of each of the plurality of light sources; and
    outputting the slant angle, tilt angle, and relative intensity of each of the plurality of light sources.

3. The method of claim 2, wherein determining the relative intensity of each of the plurality of light sources comprises:
    determining an intensity of each of the plurality of light sources;
    comparing the intensity of each of the plurality of light sources; and
    assigning a relative intensity value to each of the plurality of light sources based on the comparison.

4. The method of claim 1, wherein estimating the tilt angle associated with the light source comprises:
    determining an intensity gradient along a slant angle direction vector from the silhouette boundary;
    determining if the intensity gradient increases or decreases;
    if the intensity gradient increases:
        identifying a pixel having a highest intensity; and
        determining the tilt angle using the pixel having the highest intensity; and
    if the intensity gradient decreases:
        identifying a pixel having a lowest intensity;
        determining a pixel tilt angle of the pixel having the lowest intensity; and
        determining the tilt angle by adding ninety degrees to the pixel tilt angle.

5. The method of claim 1, wherein estimating the slant angle associated with the light source comprises:
    identifying a pixel having a highest luminance;
    determining a first light source direction using a light source direction of the pixel having the highest luminance;
    determining at least one secondary light source direction associated with a pixel in the silhouette boundary;
    adding the at least one secondary light source direction to the first light source direction to determine a slant angle direction vector if the at least one secondary light source direction is less than ninety degrees relative to the first light source direction; and
    measuring an angle between the slant angle direction vector and a z-axis to determine the slant angle.

6. The method of claim 5, further comprising:
    identifying a second light source if the secondary light source direction is greater than ninety degrees relative to the first light source direction.

7. The method of claim 1, further comprising filtering the image to decrease diffuse reflectivity.

8. The method of claim 1, further comprising determining ambient light of the image.

9. A non-transitory computer-readable medium on which is program code, the non-transitory computer-readable medium comprising:
    program code for estimating a presence of a light source from an image having been affected by the light source by identifying a local maxima pixel associated with the light source around a silhouette boundary in the image;

program code for estimating a slant angle associated with the light source using the silhouette boundary;

program code for estimating a tilt angle associated with the light source based on at least one pixel and the slant angle; and program code for outputting the slant angle and tilt angle.

10. The computer-readable medium of claim 9, wherein the image is affected by a plurality of light sources, the computer-readable medium comprising:

program code for estimating a presence of the plurality of light sources by identifying a plurality of local maxima pixels around the silhouette boundary, wherein each local maxima pixel is associated with at least one of the plurality of light sources;

program code for estimating a slant angle and a tilt angle associated with each of the plurality of light sources;

program code for determining a relative intensity of each of the plurality of light sources; and program code for outputting the slant angle, tilt angle, and relative intensity of each of the plurality of light sources.

11. The computer-readable medium of claim 10, wherein program code for determining the relative intensity of each of the plurality of light sources comprises:

program code for determining an intensity of each of the plurality of light sources;

program code for comparing the intensity of each of the plurality of light sources; and program code for assigning a relative intensity value to each of the plurality of light sources based on the comparison.

12. The computer-readable medium of claim 9, wherein program code for estimating the tilt angle associated with the light source comprises:

program code for determining an intensity gradient along the slant angle direction vector from the silhouette boundary;

program code for determining if the intensity gradient increases or decreases;

if the intensity gradient increases:
identifying a pixel having a highest intensity; and
determining the tilt angle using the pixel having the highest intensity; and if the intensity gradient decreases:
identifying a pixel having a lowest intensity;
determining a pixel tilt angle of the pixel having the lowest intensity; and
determining the tilt angle by adding ninety degrees to the pixel tilt angle.

13. The computer-readable medium of claim 9, wherein program code for estimating the slant angle associated with the light source comprises:

program code for identifying a pixel having a highest luminance;

program code for determining a first light source direction using a light source direction of the pixel having the highest luminance;

program code for determining at least one secondary light source direction associated with a pixel in the silhouette boundary;

program code for adding the at least one secondary light source direction to the first light source direction to determine a slant angle direction vector if the at least one secondary light source direction is less than ninety degrees relative to the first light source direction;

program code for measuring an angle between the slant angle direction vector and a z-axis to determine the slant angle; and program code for identifying a second light source if the secondary light source direction is greater than ninety degrees relative to the first light source direction.

14. The computer-readable medium of claim 9, further comprising program code for determining ambient light of the image.

15. A system comprising:
a processor; and
a storage device comprising a light detection engine, wherein the light detection engine is adapted to identify in an image a local maxima pixel associated with a light source that affected the image to estimate a presence of the light source, use the silhouette boundary to estimate a slant angle associated with the light source, and estimate a tilt angle based on at least one pixel of the image and the slant angle.

16. The system of claim 15, wherein the light detection engine is configured to estimate the tilt angle by determining an intensity gradient along a slant angle direction vector from the silhouette boundary, determining if the intensity gradient increases or decreases, identifying a pixel having the highest intensity and using the pixel having the highest intensity to determine the tilt angle if the intensity gradient increases, and identifying a pixel having a lowest intensity and adding ninety degrees to a pixel tilt angle associated with the pixel having a lowest intensity if the intensity gradient decreases.

17. The system of claim 15, wherein the light detection engine is configured to estimate the slant angle by identifying a highest luminance pixel, determining a first light source direction using the highest luminance pixel, determining at least one secondary light source direction, modifying the first light source direction based on the at least one secondary light source direction to determine the slant angle direction vector, using the slant angle direction vector to determine the slant angle.

18. The system of claim 15, wherein the light detection engine is adapted to:
determine an ambient light intensity of the image.

19. The system of claim 15, wherein the image is affected by a plurality of light sources, the light detection engine being adapted to:

estimate the presence of each of the plurality of light sources by identifying a plurality of local maxima pixels around the silhouette boundary, wherein each local maxima pixel is associated with at least one of the plurality of light sources;

estimate a slant angle and a tilt angle associated with each of the plurality of light sources; and determine a relative intensity of each of the plurality of light sources.

20. The system of claim 19, wherein the light detection engine determines the relative intensity of each of the plurality of light sources by:

determining an intensity of each of the plurality of light sources;

comparing the intensity of each of the plurality of light sources; and assigning a relative value to each of the plurality of light sources based on the comparison.

* * * * *